COLOR PHOTOENGRAVING TECHNIQUES FOR PRODUCING CONDUCTOR DEVICES
Filed Oct. 27, 1960
FIG.1. a
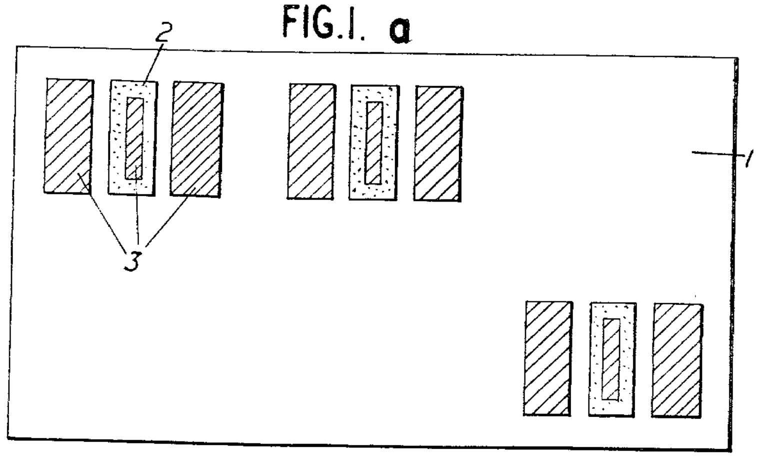
FIG.1b
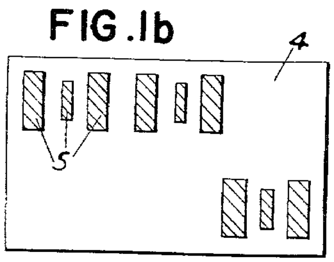
FIG. 1c
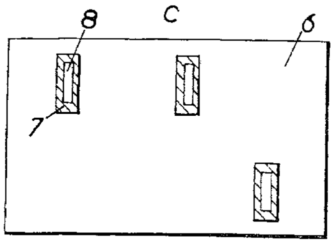
FIG.2.
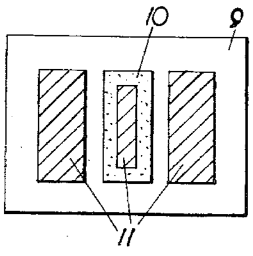
Inventors
C.F.Drake-
R.H.Hutchins
By [signature]
Attorney 3,202,509

COLOR PHOTOENGRAVING TECHNIQUES FOR PRODUCING CONDUCTOR DEVICES

Cyril Francis Drake and Raymond Harry Hutchins, London, England, assignors to International Standard Electric Corporation, New York, N.Y.

Filed Oct. 27, 1960, Ser. No. 65,323
Claims priority, application Great Britain, Dec. 24, 1959, 43,887/59
9 Claims. (Cl. 96—36)

The present invention relates to photoengraving techniques.

In order to produce large numbers of semiconductor devices of small dimensions and with uniform properties it is advantageous to process them simultaneously up to a point as near as possible to the finished product. This can be done by means of diffusion techniques, in which many devices are produced on one slice of semiconductor material and then separated from one another at a late stage in the process. For other applications, it is similarly desirable to produce complete circuit elements or switching or display matrices on a single piece of semiconductor material.

In all of these cases, the complete process may include depositing a suitable impurity material onto certain specified areas of the semiconductor, heating to bring about diffusion, and, finally, a further deposition to provide contacts to the various regions. The deposition can be by an evaporation, plating or vapour deposition process.

Metal masks may be used during the deposition processes to control the dimensions of the evaporated regions, in which case each of them must be accurately made, such that those regions at the top left-hand corner of the slice of semi-conductor material are the same as those at the bottom right-hand corner. Moreover, when two or more deposition processes involving deposition over different series of areas are to be carried out one after the other, a separate metal mask is required for each process.

It is then essential that the later series of deposited regions should be in the correct position with regard to the first, or, in other words, that when the masks are placed in a predetermined position relative to one another, then the cut-out portions in them should be in register.

In an alternative method, the mask used in one or more of the deposition processes can take the form of an oxide layer on the surface of the semiconductor material. This layer has holes, or "cut-out portions," over those regions of the semiconductor surface upon which deposition is required. After one such oxide layer has been used in a deposition process it is, of course, possible to remove it and produce another having different cut-out portions, or alternatively to use a metal mask for subsequent operations. In either case, the requirement that the cut-out portions of the various masks should be in register when they are superposed in a predetermined manner still holds.

Accordingly the present invention provides a method of producing a number of masks, such that when they are superposed in a predetermined manner, cut-out portions in the said masks will be in register with one another, which comprises producing an initial photographic film having a region corresponding to each of the said cut-out portions, the regions being in the same positions relative to one another as are the said cut-out portions when in register, the regions corresponding to cut-out portions on the same mask being of the same colour and the regions corresponding to cut-out portions on different masks being of different colours, photographing the said initial photographic film on to a number of further films or plates in such manner that an image corresponding to the cut-out portions on a different one only of the said masks is formed on each of the said further films or plates, and using the said further films or plates in a photoengraving technique to produce the required cut-out portions in the said masks.

Examples of methods according to the invention will now be described with reference to the accompanying drawings, in which:

FIGS. 1*a*, 1*b*, and 1*c* are views showing stages in a method of producing two masks according to the invention; and FIG. 2 is a view showing one stage in a further method of producing two masks according to the invention.

The method shown in FIG. 1 is for the production of masks suitable for making part of a plurality of identical semiconductor devices on a slice of semiconductor material, one of the masks having cut-out portions that define the extent of the emitter regions of the devices and the other mask having cut-out portions defining the extent of certain ohmic contacts associated with the devices.

The first stage in the process is to produce a master drawing 1, shown in FIG. 1*a*, consisting of a plurality of coloured areas on a black background. The coloured areas are divided up into two series of groups, all of the areas in the same series being of the same colour. Each group in the first series consists of one member only and is represented by a blue area 2 in FIG. 1*a*. Each group in the second series consists of three members and is represented by red areas 3 in FIG. 1*a*. Two groups only from each series are shown in the top left-hand corner of FIG. 1*a* and one group only from each series in the bottom right-hand corner. In practice, however, the whole of the master drawing is covered with groups of this type.

The master drawing 1 is a large-scale copy of the configuration required for the slice of semiconductor material at the end of the process. The outline of each blue area 2 corresponds to the outline of the emitter region of one of the devices, and hence to the cut-out portions required in one mask. The red areas 3 correspond to ohmic contacts, the central one in a group corresponding to the emitter contact and the outer two to contacts to the body of the semiconductor material, and hence to the cut-out portions required in the other mask. The relative sizes and spacing of the various areas are exactly the same as is required for the corresponding parts of the finished semiconductor material.

The second stage in the process consists of photographing the master drawing 1 on to a colour film to give an initial photographic film (not shown in the drawings). A "reversal" colour film is used for this part of the process, and so the initial photographic film is similar to the master drawing 1 in appearance, having blue regions corresponding to the blue areas 2 in FIG. 1 and red regions corresponding to the red areas 3. It differs in that it is reduced in size and that the black background of the master drawing 1 becomes opaque on the initial photographic film.

The initial photographic film is now clamped between two glass plates, illuminated by means of a white card placed at an angle of 45° behind the film to ensure uniform illumination, and photographed twice onto fine grain panchromatic plates. On the first occasion, the initial photographic film is photographed through a filter that passes only red light, and results in a first further photographic plate 4, shown in FIG. 1*b*. This has a plurality of black areas 5 corresponding to the red areas 3 of FIG. 1*a* but no areas corresponding to the blue areas 2. On the second occasion a filter that passes only blue light is used, giving a second further photographic plate 6 shown in FIG. 1*c*. This has black areas 7 corresponding to the blue areas 2 of FIG. 1*a* but no areas corresponding to the red areas 3.

Both of the further photographic plates 4 and 6 are the same size as is required for the finished slice of semiconductor material, and they are now used as follows in a photoengraving technique to produce the two masks:

One surface of a molybdenum sheet of 0.001 inch thickness is coated with a light-sensitive glue or resin, held against the first further photographic plate 4, and then exposed to ultra-violet light. The light is able to pass through all but the black areas 5 of the plate 4 and on to the glue beneath, increasing the resistance of the exposed parts to the action of a developer. The plate 4 is then removed, the unexposed parts of the glue washed away by means of the developer, and, finally, those parts of the molybdenum sheet now uncovered by glue are etched away. The result is a molybdenum sheet having cut-out portions corresponding to the black areas 5 of FIG. 1*b* and hence to the red areas 3 of FIG. 1*a*.

A similar technique is now carried out on a second molybdenum sheet, this time using the second further photographic plate 6 of FIG. 1*c*. In this case, those parts of the sheet underneath the black areas 7 of FIG. 1*c* are etched away, and, of course, the inner areas 8 enclosed by them also drop out.

By means of the above processes one of the molybdenum sheets has cut-out portions corresponding to the outline of the blue areas 2 of FIG. 1*a* and the other has cut-out portions corresponding to the red areas 3 of FIG. 1*a*, they can therefore be used as masks in the evaporating processs. Moreover, since the two further photographic plates 4 and 6 of FIGS. 1*b* and 1*c*, respectively, are exactly the same size, their black areas 5 and 7, respectively, will be in register if the two plates are superposed, and the same is true of the cut out portions on the resultant masks.

An alternative method to that described above involves the use of a simpler master drawing, designated 9 in FIG. 2. This master drawing is used to produce two masks identical with those described above, although it contains only one group of coloured areas from each series instead of the complete series present on the master drawing 1 of FIG. 1*a*. One group consists of a blue area 10 and the other of three red areas 11, each of the areas being one hundred times the size required for the corresponding area on the final slice of semiconductor material.

The master drawing 9 is photographed in colour onto a master film, its size being reduced by a factor of twenty at the same time, and the master film is then inserted sequentially into "windows" in an opaque frame. The relative spacing of the windows is the same as is required for the spacing of the groups of cut-out portions on the two masks. Whilst in each window the master film is photographed onto the same colour film, leading to an initial photographic film exactly the same as that described with reference to FIG. 1, above. The initial photographic film is then used to produce two masks in the same way as described above.

An alternative process makes use of the same master drawing 9 as shown in FIG. 2 but this is then photographed a number of times onto separate colour films to give a number of films equal to the number of groups in a series. The separate films are then assembled between two sheets of glass, their relative positions being the same as the required relative positions of the cut-out portions on the two masks, and photographed in colour, again giving an initial photographic film the same as that described with reference to FIG. 1. The production of the masks from the initial photographic film is then as described above.

Although two molybdenum masks were used in the examples described above, an oxide layer on the surface of the semiconductor material can be used in place of one or both of them. If one evaporation process is to be performed using a molybdenum mask and one using an oxide layer, two further photographic plates of the same construction as those designated 4 and 6 in FIGS. 1*b* and 1*c*, respectively, are made by any of the processes described above. A molybdenum mask is then made from the further photographic plate 6 and evaporation and diffusion processes carried out to produce the emitter regions of the devices, corresponding to the blue areas 2 of FIG. 1*a*. An oxide layer is now formed on the surface of the semiconductor material and this is then coated with a light-sensitive glue or resin, held against the further photographic plate 4, and exposed to ultra-violet light. Unexposed portions of the glue or resin can then be washed away by means of a developer, and those parts of the oxide layer now uncovered are removed by hydrofluoric acid. The oxide layer now has cut-out portions corresponding to the black areas 5 of FIG. 1*b* and is used as a mask in an evaporation process. At the end of the evaporation process, material deposited on to the semiconductor material itself is alloyed into it by slight heating, thus providing the contacts to the devices, while that deposited on the oxide layer is unaffected and can be removed afterwards by the use of hydrofluoric acid.

When a mask consisting of an oxide coating is required to have cut out portions corresponding to the outline of the blue areas 2 of FIG. 1*a*, the further photographic plate 6 of FIG. 1*c* is of no use. This is because after the oxide layer has been exposed to ultraviolet light and etched, those parts of the layer corresponding to the inner areas 8 of FIG. 1*c* cannot drop out, as they can in the case of a molybdenum mask. Therefore, the only areas of the semiconductor material exposed for the evaporation process are areas corresponding to the black areas 7 of FIG. 1*c*. To overcome this difficulty the central one of each group of three red areas 3 in FIG. 1*a* is coloured white. The remainder of the process can then be carried out as above, these white areas transmitting both the red and the blue lights used in making the further photographic plates 4 and 6, respectively, and thus leading to a black inner area 8 on the further photographic plate 6. The remainder of the process is then carried out as above.

In the example of the invention described above, it was only necessary to produce two masks, and consequently only two colours were needed on the master drawings and initial photographic film and only two further photographic films were constructed. However, if three or more evaporation processes are to be carried out, then three or more masks may be required, in which case a corresponding number of colours are required to designate the different areas on the master drawing and a corresponding number of further photographic films are required.

It should be noted that, although the areas were coloured blue and red in the above examples, other colours can equally well be used, and naturally when three or more masks are required, extra colours must be used.

The above methods can also be modified in that the first or second further photographic film can be made by shining a red or blue light, respectively, through the initial photographic film instead of using the appropriate filter. When metal masks are used, these can be made of a metal other than molybdenum, and may be made by the converse of an etching process; that is to say, the mask may be built up on a metal plate coated with photosensitive material and exposed through an appropriate negative, developed, and subsequently plated with a suitable metal which will only be deposited on those regions that are free of the photosensitive material. The mask, i.e., the plating, is then stripped off the metal plate. It will be clear that in this process a reversed negative must be used, this being obtained by taking a contact print on to a photographic film or plate from any of the further photographic films produced in the examples above.

While the principles of the invention have been described in connection with specific embodiments and particular modifications thereof, it is to be clearly understood that this description is made only by way of example and not as a limitation in the scope of the invention.

What we claim is:

1. A method of producing a plurality of masks having cut-out portions which will be in register when the masks are superposed which comprises:

(a) constructing a master drawing having regions in different colours each corresponding in shape to a different one of said cut-out portions, said regions being on a black background;

(b) photographing said drawing on coloured film, whereby said regions appear on said film in their respective colours with the background opaque;

(c) producing a plurality of further photographs from said coloured film each containing opaque regions corresponding to the regions of a particular colour but no other region, the background being transparent, said further photographs being exactly the same size and capable of exact registration;

(d) providing a plurality of thin metal sheets, one for each further photograph;

(e) coating said sheets with a light-sensitive material whose resistance to a developer is increased by the action of light;

(f) exposing said sheets, thus coated, to light through respective ones of said further photographs, whereby in each case the regions corresponding to the opaque regions on the further photographs will be unaffected, while the resistance to the developer of the background is increased;

(g) treating the sheets with developer to remove the unexposed parts of the light sensitive layer; and (h) etching away the portions of the sheets from which the light sensitive layer has been removed, leaving holes through the sheets corresponding in shape to the original respective colour regions on said drawing.

2. A method of producing two masks, according to claim 1, in which the light-sensitive material is a light-sensitive glue whose resistance to the developer changes when exposed to ultra-violet light, and in which the light to which the coated sheets are exposed is ultra-violet light.

3. A method of producing two masks, a first and a second, according to claim 1, in which the plurality of cut-out portions in the said first and second masks is made up of a first and a second series of groups of cut-out portions respectively, each of the groups in a series being identical with one another, the said master drawing having areas corresponding to one of the said first series of groups and areas corresponding to one of the said second series of groups, the areas corresponding to each group being in a different color.

4. A method of producing two masks, according to claim 3, in which the said initial photographic film is produced by photographing the said master drawing a number of times on to different portions of the same photographic film.

5. A method of producing two masks, according to claim 3, in which the said initial photographic film is produced by photographing the said master drawing a number of times, each time on to a separate film, placing the separate films in the relative positions required for the said initial photographic film, and photographing the said separate films.

6. A method of producing two masks, according to claim 1, in which at least one of said further photographs is made by photographing the said initial photographic film through a filter, the said filter passing light of a wavelength corresponding to the said first or second colour, respectively, but not light of a wavelength corresponding to the said second or first colour, respectively.

7. A method of producing two masks, according to claim 1, in which at least one of said further photographs is made by photographing the said initial photographic film using only light of a wavelength corresponding to the said first or second colour, respectively.

8. A method of producing two masks, according to claim 2, in which the said sheets of metal are molybdenum.

9. A method of producing two masks having cut-out portions which will be in register when the masks are superposed, and one of which is integral with one surface of a semi-conductor body, which comprises:

(a) constructing a master drawing having regions in different colors, each corresponding in shape to a different one of said cut-out portions, said regions being on a black background;

(b) photographing said drawing on a color film, whereby said regions appear on said film in their respective colors with the background opaque;

(c) producing two further photographs from said color film, each containing opaque regions corresponding to the regions of a particular color but no other regions, the background being transparent, said further photographs being exactly the same size and capable of exact registration;

(d) providing a metal sheet for the first mask;

(e) coating one surface of a semi-conductor body with an oxide for the second mask;

(f) coating the metal sheet and the oxide layer with a glue whose resistance to a developer is increased by exposure to ultra-violet light;

(g) exposing said semi-conductive body and metal sheet to ultra-violet light through respective ones of said further photographs, whereby in each case the regions corresponding to the opaque regions on the further photograph will be unaffected, while the resistance to the developer of the background is increased;

(h) treating the surfaces of the sheet and the semi-conductor with developer to remove the unexposed parts of the light-sensitive layer; and (i) etching away the portions of the metal sheet and the oxide layer on the semi-conductor from which the light-sensitive glue has been removed, leaving holes through the sheet and exposed areas of the semi-conductor body corresponding in shape to the original respective colored regions on said drawing.

References Cited by the Examiner

UNITED STATES PATENTS

| | | | |
|---|---|---|---|
| 761,887 | 6/04 | Jacobson | 96—44 |
| 887,845 | 5/08 | Rechard | 96—44 |
| 1,087,725 | 2/14 | Carpentier | 96—44 |
| 1,499,230 | 6/24 | Lage | 96—70 |
| 1,612,079 | 12/26 | Von Tolnay | 96—70 |
| 2,088,145 | 7/37 | Von Biehler | 96—70 |
| 2,208,754 | 7/40 | Eggert et al. | 96—70 |
| 2,242,747 | 3/41 | Frankenburger et al. | 96—70 |
| 2,441,960 | 5/48 | Eisler | 96—36 X |
| 2,596,677 | 5/52 | Gosling et al. | 96—44 X |
| 2,706,697 | 4/55 | Eisler. | |
| 2,735,763 | 2/56 | Heath | 96—36 |
| 2,866,397 | 12/58 | Gillette | 96—42 X |
| 2,927,020 | 3/60 | Zilli | 96—36 X |
| 2,990,282 | 6/61 | Wicke | 96—36 |

FOREIGN PATENTS 205,807 11/24 Great Britain.

OTHER REFERENCES

Jaffee et al.: Color Separation Photography, 1st ed., 1959, Lithographic Technical Foundation, Inc., New York, New York, pages 89–96.

NORMAN G. TORCHIN, *Primary Examiner.*
MILTON STERMAN, *Examiner.*